US 6,574,733 B1

United States Patent
Langford

(10) Patent No.: US 6,574,733 B1
(45) Date of Patent: Jun. 3, 2003

(54) CENTRALIZED SECURE BACKUP SYSTEM AND METHOD

(75) Inventor: Glenn C. Langford, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/236,929

(22) Filed: Jan. 25, 1999

(51) Int. Cl.[7] .................................................. H04L 9/32
(52) U.S. Cl. ........................................ 713/194; 713/193
(58) Field of Search ................................. 713/193–194

(56) References Cited

U.S. PATENT DOCUMENTS

| | | | | |
|---|---|---|---|---|
| 5,778,068 A | * | 7/1998 | Johnson et al. | 713/193 |
| 5,963,642 A | * | 10/1999 | Goldstein | 713/193 |
| 6,134,660 A | * | 10/2000 | Boneh et al. | 713/193 |
| 6,170,058 B1 | * | 1/2001 | Kausik | 713/193 |

OTHER PUBLICATIONS

Bruce Schneier, Applied Cryptography 1996, Katherine Schowalter, second edition, pp. 185–187.*

* cited by examiner

Primary Examiner—Gilberto Barron
Assistant Examiner—Kambiz Zand
(74) Attorney, Agent, or Firm—Vedder, Price, Kaufman & Kammholz

(57) ABSTRACT

Briefly, a centralized secure data backup system pulls information to be securely backed-up from one or more data sources such as computer nodes or other communication units. A processor or other suitable processor centrally initiates extraction of data to be backed-up from a plurality of processing nodes. The processor employs a backup data encryptor that encrypts the centrally extracted data using a public key based cryptographic system. Data is encrypted using a suitable symmetric key and symmetric cryptosystem. Then the symmetric key is wrapped using the public encryption key of the data source, such as a user, organization administrator, software application or other entity.

18 Claims, 5 Drawing Sheets

CENTRALIZED SECURE BACKUP SYSTEM AND METHOD

FIELD OF THE INVENTION

The invention relates generally to systems and methods for backing up data and more particularly to systems and methods that perform centralized secure backup of data.

BACKGROUND OF THE INVENTION

In most computing systems, it is desirable to periodically backup some or all of the files local to that system. This is to allow recovery of information in case of a partial or total system failure.

There are many different causes of system failures that may result in the local loss of data. For example, a disk drive may fail, the entire computer may be stolen or rendered inoperative due to natural disasters, such as fire or flooding. In each case, the backup media that is not affected by the failure can be used in a recovery. This usually implies that the backup data is physically separate from the target computer. In the case of a natural disaster for example, it is often desirable to have some backup data located off site, such as in a different building, which would not be affected.

In a networked environment with large numbers of computers or other communication systems employing large numbers of processing units, the users are sometimes required to manually and individually backup each of the nodes or processing units (the data on each unit). The user might routinely copy files to a server for example. However, this can be inconvenient for the computer user and unreliable if the user forgets to perform the backup operation or if backup media is not available. Another strategy has been to establish one or more backup servers in the network. Generally, the backup servers are configured with names of the file system directories on various user machines that are to be backed up at a convenient time (for example daily when the network is not busy). The backup servers copy the necessary data files over the network and store the user data on backup media. This technique automates the process and separates the backup data from the user workstation in the case of failure. However, the difficulty with this scheme is that sensitive data may be exposed to anyone who handles the backup media. For this reason, some organizations may specify that backup media may not be sent off site to third party disaster recovery services.

Other computer systems and communication systems allow end users to encrypt their most sensitive data directly on their node. However, end users may not encrypt all of their data or some users, may not encrypt any data at all because it is typically a manual process. For example, known public key cryptography systems allow users to encrypt files to be backed up. Typically an end-user designates the data (files, directories, programs or other data) to be backed up and sends the information to a server using a push approach. However it would be desirable to relieve the end user of the responsibility to secure the backup data. The use of a public key asymmetric cryptosystem, as known in the art, employs a private/public key pair whereby a user typically encrypts data using a public encryption key and uses a private decryption key, known only to a specific user or software application, to decrypt information encrypted under the public encryption key. However, these systems can leave information unencrypted where the user forgets to encrypt the information and also requires the user to push the data to the network.

Symmetric cryptographic systems are known that employ a password for example, to protect and recover information. Such systems typically require a user or other entity to supply the password to both the sending party and receiving party. Access to the password however allows access to the data so this type of approach may not be secure enough where the data is highly confidential. Typically an administrator defines a password and can access all backed-up data and the end-user generally has no control over who can access the encrypted information.

Consequently, there exists a need for a secure data backup system that employs a suitable level of cryptographic security while affording a centralized backup of data. In addition, it would be desirable if such a system allowed only the owner of the data to be able to decrypt any information stored during the process so that the third party repositories and other unauthorized personnel cannot readily decrypt the information.

DETAILED DESCRIPTION OF THE PREFERRED EMBODIMENT

Briefly, a centralized secure data backup system pulls information to be securely backed-up from one or more data sources such as computer nodes or other processing units such as communication units. A processor centrally initiates extraction of data to be backed-up from a plurality of processing nodes. The processor employs a backup data encryptor that encrypts the centrally extracted data using a public key based cryptographic system. First, data is encrypted using a suitable symmetric key and symmetric cryptosystem. Then the symmetric key is wrapped using the public encryption key of the data source owner, such as a user, organization administrator, software application or other entity. If desired, the private decryption key may be backed up by a public key infrastructure. In the event that data is lost or needs to be recovered, including highly confidential data such as a user's or node's associated private decryption key, the private decryption key would be recovered first. The user data to be restored is then decrypted using the private decryption key.

In one embodiment the backup system is configurable so that an entire user workstation or communication unit can be backed-up using a user's public encryption key. For a machine shared by several users, several different public encryption keys could be used, such as one for each user, one, for each software application or other suitable category. Moreover, a plurality of workstations could be backed up using an organization's public encryption key.

Figure 1:
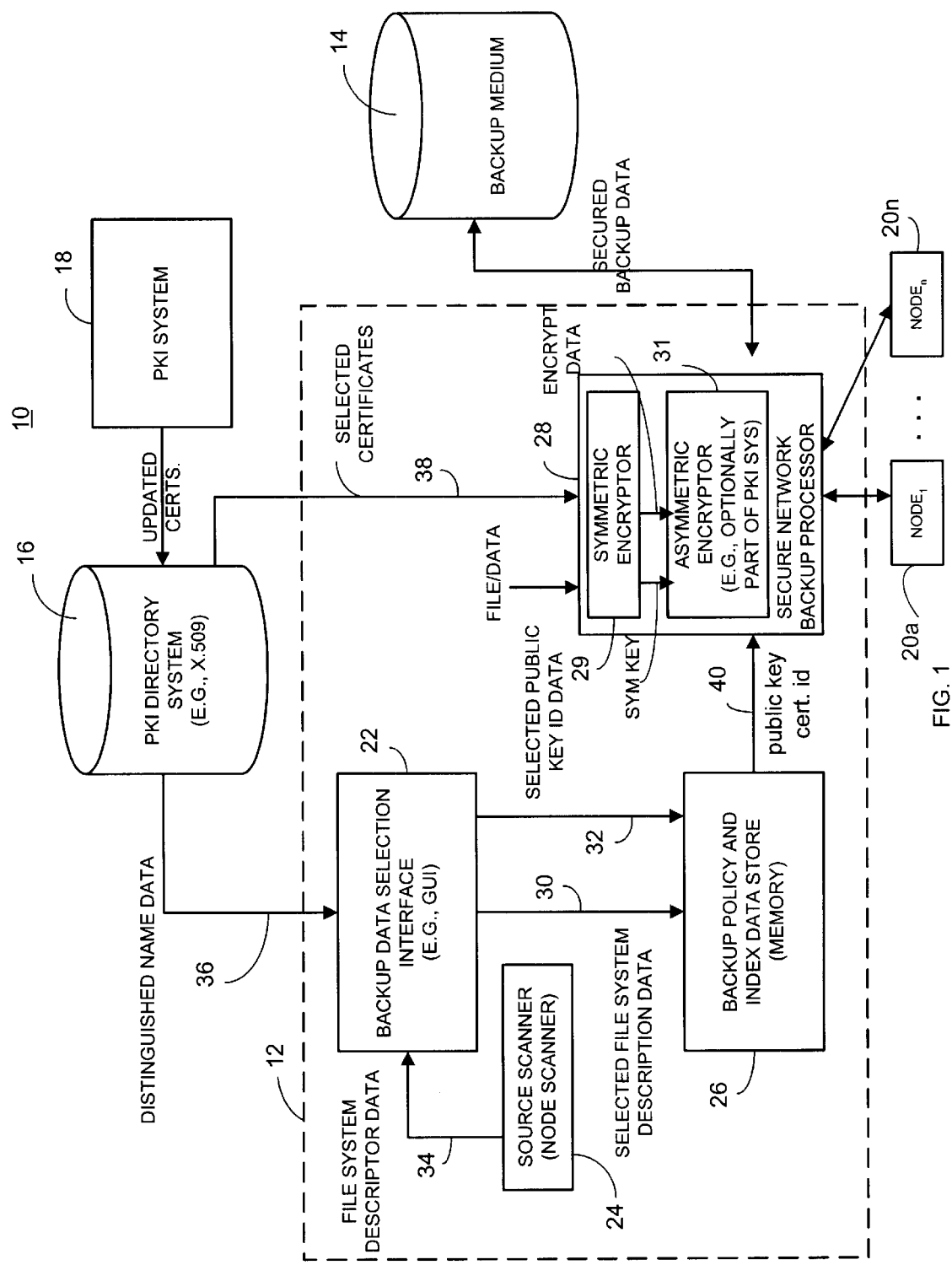
FIG. 1 is a block diagram illustrating one example of a system for providing centralized secure backup of data in accordance with one embodiment of the invention.

FIG. 1 shows a centralized secure data backup system 10 employing a centralized secure data backup processor 12, backup medium 14, a public key infrastructure (PKI) directory system 16, such as an X.509 directory system and a public key infrastructure (PKI) system 18. The centralized secure data backup processor 12 communicates with a plurality of data sources 20a–20n such as computer nodes, software applications, communication units or other suitable sources. The system 10 facilitates centralized secure backup of data.

The centralized secure data backup processor 12 includes a backup data selection interface 22, a data source scanner 24, a backup policy index data store 26 and a secure network backup processor 28 that serves a public key based backup data encryptor. The backup processor 28 includes a symmetric cryptosystem that employs a symmetric encryptor 29 using a symmetric key to encrypt data and an asymmetric encryptor 31 that wraps (encrypts) the symmetric key using a selected public encryption key. The centralized secure data backup processor 12 centrally initiates extraction of data from the data sources 20a–20n for data that is to be backed-up based on for example, centralized backup policy data 26. Centralized backup policy data may include, for example, data representing which files and which sources are to be centrally secured and backed up. The secure network backup data processor 28 serves as a backup data encryptor operatively coupled to encrypt the centrally extracted data using one or more public keys from public key certificates created by PKI system 18.

The backup data selection interface 22 may be a graphic user interface that facilitates the backup policy index data store 26, which indexes file system descriptor data 30 with associated public key identification data 32. The file system descriptor for data 30 may be, for example, data representing which drive and/or which data on a given node's drive is to be extracted and securely backed up. As such, the backup policy index data store maps associated data description data to the public key identification data associated with a user of the node being backed. The source scanner 24 scans the units 20a–20n to determine which units are present. The source scanner provides file system descriptor data 34 that represents which data is to be pulled from the various units 20a–20n. For example, file system descriptor data 30 may include directory names and associated file names so that the processor 12 knows which information to pull from which of the units 20a through 20n. The backup data selection interface 22 obtains distinguished name data 36 from the PKI directory system. Distinguished name data 36 may include for example the PKI identity of the user of the node being backed up, or any other identity located in the PKI directory system. Backup policy data such as data representing which nodes are to be backed-up or which type of files are to be securely backed up, may be input by an administrator through the backup data selection interface 22. As such, the backup policy data represents for an entire system centrally assignable and selectable secured backup data control so that all nodes or units are backed up in the same manner. Backup policy data is also used to determine whether backup data is to be encrypted, since not all data needs to be encrypted and may be left in plaintext form if desired. The processor 12 analyzes the backup data to determine which data is to be encrypted for secure backup and then determines the appropriate public encryption key to be used by the secure network backup processor and PKI encryptor to encrypt the backup data. The appropriate public key is selected based on the public key certificate corresponding to the distinguished name data. The secure network backup data processor obtains a public key certificate 38 from the PKI directory system 16 that includes a public encryption key corresponding to the backup policy data from the index data store such as public key identification data 40. In the preferred embodiment, public key identification data 40 is the same as the distinguished name data 36 assigned by the backup data selection interface 22.

Figure 2:
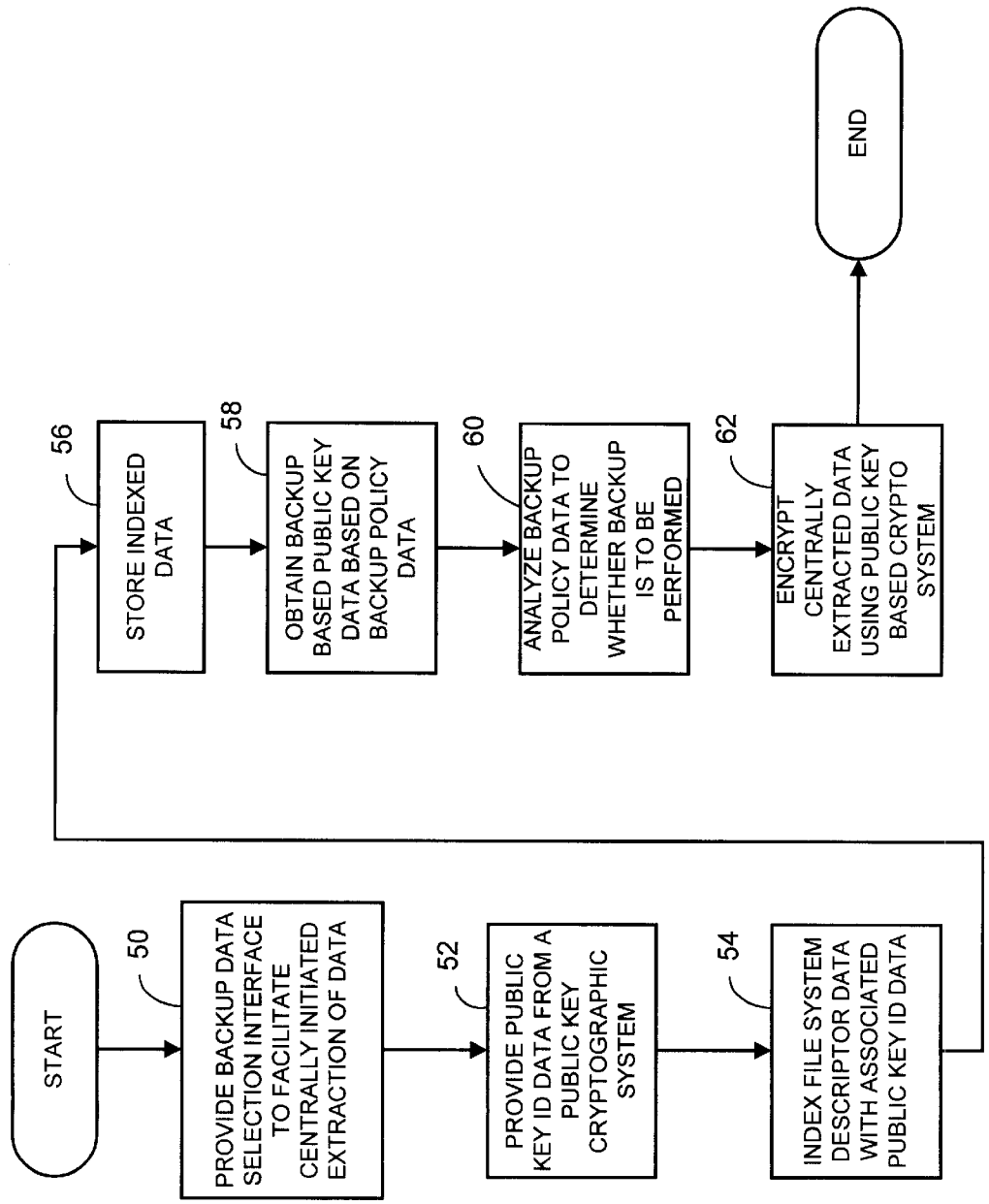
FIG. 2 is a flowchart illustrating the operation of the system shown in FIG. 1.

FIG. 2 shows a method used by the centralized secure data backup processor 12 to securely encrypt the data using a pull technique. As shown in block 50 the system provides the backup data selection interface, such as the graphical interface, to facilitate centrally initiated extraction of data. The processor also provides the public key identification data (PKID) 32 obtained from a public key system 18 as shown in block 52. The file system descriptor data 34 is then indexed or otherwise associated with PKID 32 as shown in block 54. As shown in block 56 the processor stores the indexed data in a backup policy index data store. The system obtains the backup based public key data based on backup policy data as shown in block 58. For example, in the preferred embodiment the public key identification data is a distinguished name and a public key certificate is obtained from a Directory using that distinguished name. As shown in block 60, the system analyses the backup policy data to determine whether the data is to be backed up. As shown in block 62, the system encrypts the centrally extracted data using the public key based cryptosystem 18, namely the public key encryption engine to wrap a symmetric key.

Figure 3:
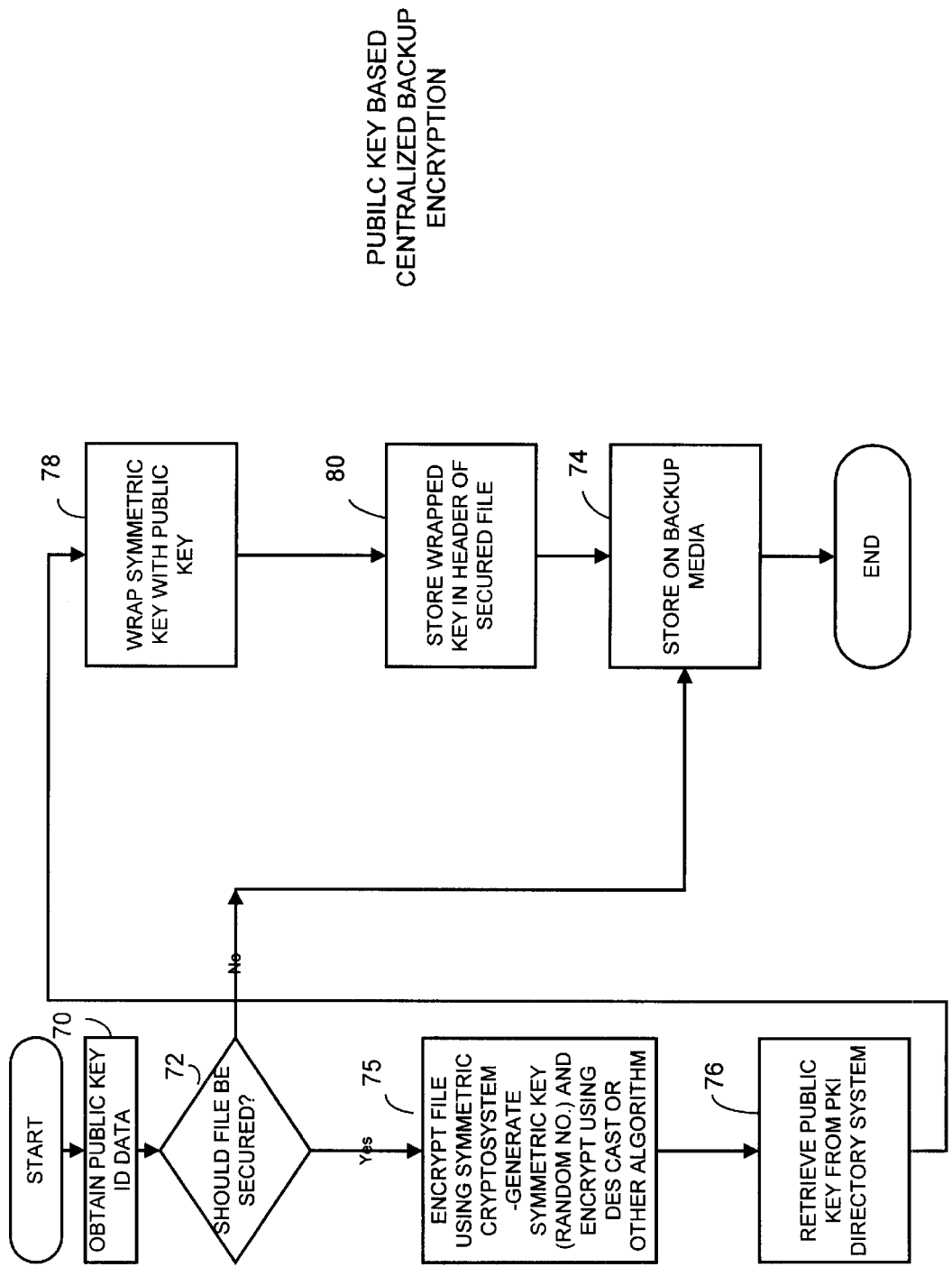
FIG. 3 is a flowchart illustrating a method of centralized backup encryption in accordance with one embodiment of the invention.

Referring to FIG. 3, a more detailed operation of the processor performing public key based centralized backup encryption is described. As shown in block 70, the processor obtains the public key identification data associated with a given node, for example, and then determines whether the files should be secured as shown in block 72. This is done based on the backup policy data which indicates from a system standpoint which drive, files, or other data on each node or communication unit is to be securely backed-up. If the file associated with the public key I.D. data is not to be secured, (e.g.,encrypted), the system then stores the unsecured information on backup media as shown in block 74. However if the backup policy data indicates that the retrieved information corresponding to the public key I.D. data is to be securely backed-up, the system encrypts the file or data first using a symmetric cryptosystem. The symmetric cryptosystem may, for example, use a random number generator as a symmetric key generator and encrypt using DES, CAST or other suitable symmetric encryption algorithm to encrypt the selected data to be backed-up as shown in block 75. As shown in block 76, the system retrieves the public key associated with the selected public key I.D., data for the given node or software application used to generate the data, or other suitable source, and retrieves the corresponding public key certificate from the PKI directory. The backup processor then employs the asymmetric encryptor such as a public key encryptor and wraps the symmetric key with the public key obtained from the public key certificate as shown in block 78. The system then stores the wrapped key in the header of the encrypted file as shown in block 80. The stored wrapped symmetric key in the header along with the secured data is then stored on the backup- media as shown in block 74.

Figure 4:
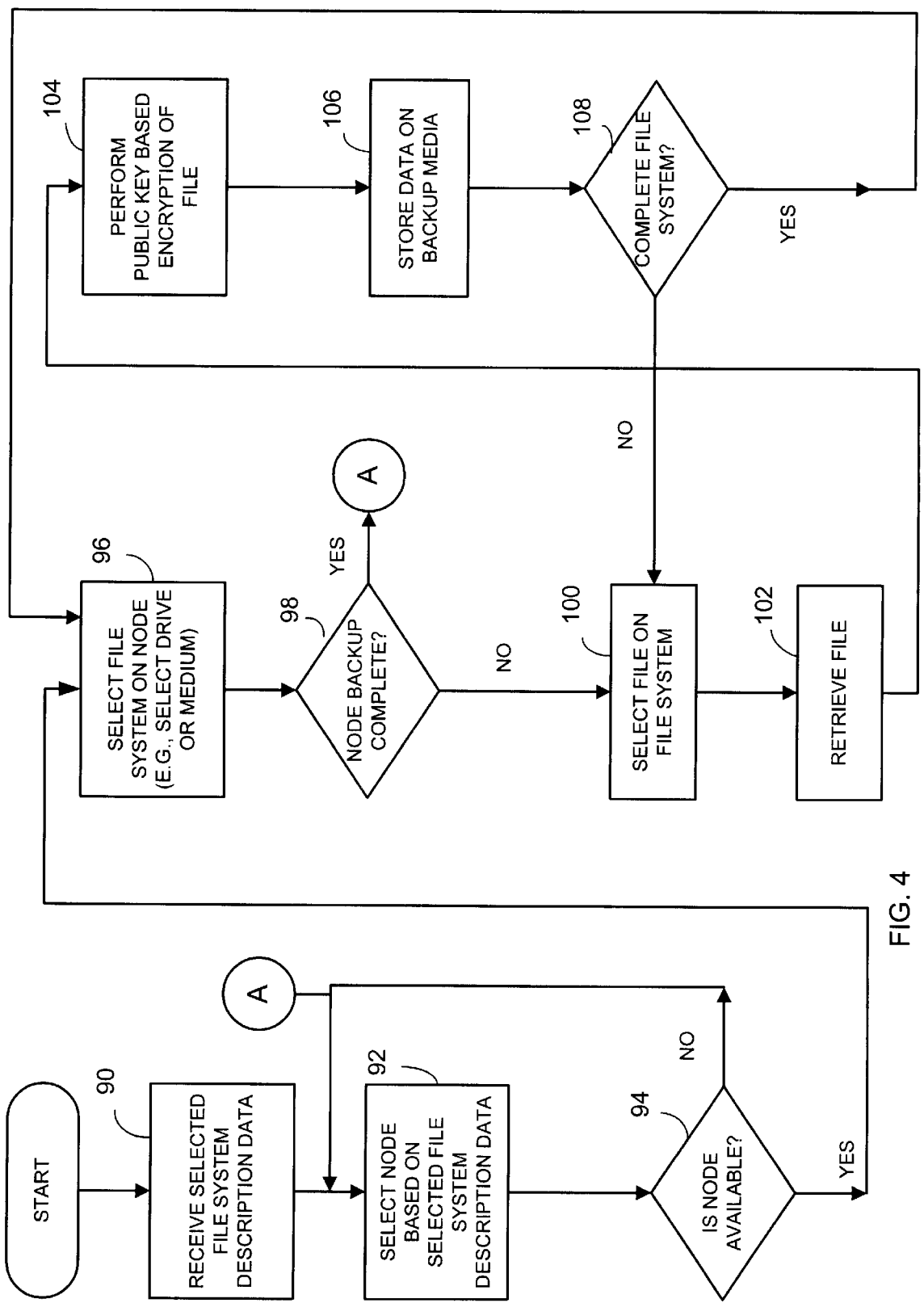
FIG. 4 is flowchart illustrating the operation of a secure network backup processor in accordance with one embodiment of the invention.

Referring to FIG. 4, the operation of the secure network backup processor 28 is shown wherein the processor receives the selected file system descriptor data as shown in block 90. The processor then selects the appropriate data source based on the selected file system descriptor data as shown in block 92. The processor determines whether the source is available as shown in block 94. If the data source is not yet available, the system waits and selects another node based on the selected file system descriptor data. The selected file system descriptor data may be data for example selected by the administrator through the backup data selection interface 22 which selects which file, data, node, drive or other category of information is to be securely backed-up.

As shown in block 96, the system selects the file system on the node determined by the file system description data. The processor then determines whether the node has been completely backed-up as shown in block 98. If the node has been completely backed-up, the system then selects another node or data source in the network as shown in block 92. However, if the node has not been completely backed-up, the processor selects a next file indicated in the file system descriptor data as shown in block 100. As a given file system, such as a particular disk drive has been completed the system then determines whether it should select another file based on whether or not the selected file system description indicates more than one file system on a given node or data source should be backed-up. The processor then retrieves the file as shown in block 102 and performs public key based encryption of the symmetric encryption key as previously described by wrapping the symmetric key with the public key, as shown in block 104. As shown in block 106, the processor then stores the wrapped key and encrypted data on the backup media and determines as shown in block 108 whether the complete file system has been backed-up.

By way of example; the system may use index data such as a table or index of public keys corresponding to the data to be backed-up. For example, the backup policy and index data store may include a table having machine or data source identifiers such as node A, representing a first node, node B representing a second node and so on along with distinguished name data representing a name or other I.D. data of a user so that the name may be used to retrieve the corresponding public key certificate for that user. Alternatively, the associated public keys for each of the nodes can be stored that have been obtained from public key certificates. As known in typical public key infrastructures, certificates may expire or be revoked for various reasons and as such it is desirable to have the system ensure that the public key certificate is still valid for a given data source prior to using the public key to wrap the symmetric key. As such, the public key certificates are obtained from the PKI directory and validated prior each backup.

In another embodiment, the index data may be for example on a file or folder basis wherein each file has a given name and then is assigned a distinguished name such as the name of a user who generated the data or the name of the node on which the data is present. In the instance where each user is given a public key, it is desirable to have each folder identified by the public key of the user that generated the data in the file. In this way, an administrator through the backup data selector interface may select the files determined to be available from the source scanner that should be encrypted. The public key infrastructure uses the distinguished name as an index to a given certificate. Hence, the processor determines which files to pull based on the index data and uses the policy data to determine which files must be encrypted.

Figure 5:
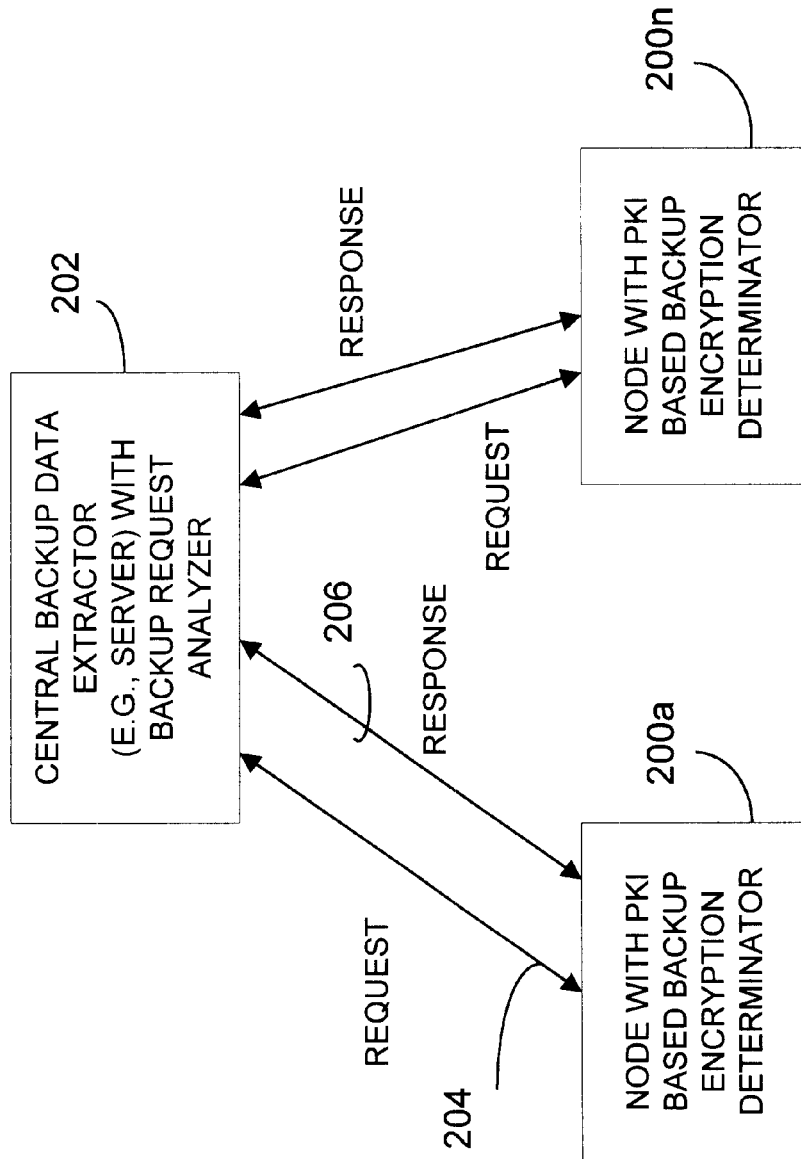
FIG. 5 is a block diagram illustrating a system for facilitating centralized secure backup of data in accordance with one embodiment of the invention.

Referring to FIG. 5, an alternative embodiment shows a node 200 initiating a certificate verification with the processor 202 to, confirm that the processor 202 can be trusted. This may also be done w/r/t the previously described systems. The node 200 generates the request data 204 to see which files will be pulled and which files (data) need to be encrypted. The processor 202 then generates response data 206 back to the node representing the name of the files to be pulled and encrypted. In this embodiment, the node or data source 200 includes the symmetric encryptor and asymmetric encryptor and performs the encryption process that was mentioned earlier as being performed outside the node. As such, in this embodiment, the encryption of the files is being performed by the data source or node instead of the central server or processor. The node 200 includes a secure backup encryption determinator that determines, based on the response data whether to encrypt a file prior to allowing the server to pull information.

As such, the above system provides an automated secure backup system which automatically encrypts information prior to being backed-up., The secure backup system facilitates selective recovery of backup data based on at least one private decryption key. The encryption system allows a user independent recovery in that the decryption key (the private decryption key) necessary to decrypt the information on the backup is only retained by the party (or application) who originated the data. Accordingly, if a user wishes to recover the information, only the user or the software application that generated the data has the appropriate private decryption key so that the secured data is not unnecessarily exposed. In addition, since the information is securely backed-up (encrypted), the backup media can be shipped to an off site storage facility with improved protection against potential compromise as with plaintext based backup systems. Moreover, the system automatically determines whether the public key being used to encrypt the information is valid by obtaining the public key certificate from the PKI system. If the backup policy changes; for example if a group of users is no longer allowed to utilize the backup system, this information will be reflected in the certificate that is obtained (for example, due to revocation) and will then allow the system to automatically make changes as to which information will be stored. In addition, the use of an asymmetric encryption backup process also allows the private decryption key to be backed-up. Hence the integrity of the backup data is improved.

Accordingly, a trusted individual, such as a backup administrator defines a mapping through the data selected interface for a workstation, workstation file space, communication unit or other entity to a user. The centralized secure backup processor later retrieves an associated public key based on the initial mapping. The public key may be obtained for example through a certificate look-up in a X.509 directory, as known in the art, or other suitable public key directory system. The centralized secure data backup processor, such as a server, identifies the set of nodes to be backed-up or files from different nodes to be backed-up or other data to be backed-up. The centralized secure data backup processor is authenticated by a client or application to confirm that it is a trusted authority to be performing centralized backup operation.

Connection is then established between the centralized secure data backup processor and the appropriate node or communication unit. The centralized secure data backup processor retrieves files over the network from the various nodes including in one embodiment encrypted information and plain text data which has not been encrypted. In another embodiment the centralized secure data backup processor encrypts all information or in another alternative each node encrypts all data prior to communicating the information to the centralized secure data backup processor. Once the centralized secure data backup processor retrieves the data to be backed-up, the backup server looks up the associated public key to use for encryption based on the machine identity or mapping or uses an organization public key if desired. The received data is compressed (optionally) and encrypted by the centralized secure data backup processor using the retrieved public key. The encrypted files are then stored on backup media.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing centralized secure backup of data comprising the steps of:
   providing centrally initiated extraction of data to be backed up from a plurality of processing nodes;
   encrypting the centrally extracted data using a public key based cryptographic system; and
   analyzing backup policy data to determine whether backup data is to be encrypted and if so, determining a public encryption key to be used by the public key cryptographic system to wrap a symmetric key that is used to encrypt the backup data.

2. The method of claim 1 including the steps of:
   providing a backup data selection interface to facilitate central extraction of data to be backed up;
   indexing file system descriptor data with associated public key identification data; and
   storing the indexed data.

3. The method of claim 1 wherein the step of encrypting includes obtaining backup based public key data based on backup policy data.

4. The method of claim 3 including the step of obtaining a public key certificate that includes a public encryption key corresponding to the backup policy data.

5. The method of claim 2 including providing the public key identification data from a public key infrastructure system to at least one central backup unit that contains the backup data selection interface.

6. The method of claim 1 including generating request data and generating response data to determine, based on the response data, whether to securely backup data.

7. The method of claim 1 including storing index data in a directory for use by other servers.

8. A system for providing centralized secure backup of data comprising:
   a processor that centrally initiates extraction of data to be backed up from a plurality of processing nodes wherein the processor analyzes backup policy data to determine whether backup data is to be encrypted and if so, determining a public encryption key to be used by the public key cryptographic system to wrap a symmetric key that is used to encrypt the backup data; and
   a backup data encryptor coupled to encrypt the centrally extracted data using a public key based cryptographic system.

9. The system of claim 8 including:
   a backup data selection interface, operatively coupled to the processor, to facilitate central extraction of data to be backed up;
   a backup data indexer that indexes file system descriptor data with associated public key identification data; and
   memory that stores the indexed data.

10. The system of claim 8 wherein the backup data encryptor obtains backup based public key data based on backup policy data.

11. The system of claim 10 wherein the backup data encryptor obtains a public key certificate that includes a public encryption key corresponding to the backup policy data.

12. The system of claim 8 including a processor adapted to generate request data and another processor adapted to generate response data that determines, based on the response data, whether to securely backup data.

13. The system of claim 8 including memory that stores index data in a directory for use by other servers.

14. A digital storage medium that stores programming instructions that, when read by at least one processing module, causes the processing module to facilitate centralized secure back-up of data, the digital storage medium comprising:
   program instruction memory that contains programming instructions that cause the processing module to provide centrally initiated extraction of data to be backed up from a plurality of processing nodes; encrypt the centrally extracted data using a public key based cryptographic system, and to analyze backup policy data to determine whether backup data is to be encrypted and if so, determining a public encryption key to be used by the public key cryptographic system to wrap a symmetric key that is used to encrypt the backup data.

15. The storage medium of claim 14 including memory that stores programmed instructions that facilitates the processing module to:
   provide a backup data selection interface to facilitate central extraction of data to be backed up;
   index file system descriptor data with associated public key identification data; and
   store the indexed data.

16. The storage medium of claim 14 including memory that contains programmed instructions to obtain backup based public key data based on backup policy data.

17. The storage medium of claim 14 including memory that contains programmed instructions to obtain a public key certificate that includes a public encryption key corresponding to the backup policy data.

18. The storage medium of claim 14 including memory that contains programmed instructions to provide the public key identification data from a public key cryptographic system to at least one central backup unit that contains the backup data selection interface.

* * * * *